(12) United States Patent
Cook et al.

(10) Patent No.: US 6,462,446 B2
(45) Date of Patent: Oct. 8, 2002

(54) RESILIENT RING MOTOR MOUNTING ASSEMBLY

(75) Inventors: Michael Andrew Cook, Silver Lake; Paul Christopher Lin, Fort Wayne; Vijay Pal Singh Chahar, Fort Wayne; Sreeramachandra Murty Ragidimilli, Fort Wayne; Timothy Wilbur Carey, Kendallville, all of IN (US)

(73) Assignee: General Electric Company, Schenectady, NY (US)

( * ) Notice: Subject to any disclaimer, the term of this patent is extended or adjusted under 35 U.S.C. 154(b) by 13 days.

(21) Appl. No.: 09/749,206

(22) Filed: Dec. 27, 2000

(65) Prior Publication Data

US 2001/0048258 A1 Dec. 6, 2001

Related U.S. Application Data

(60) Provisional application No. 60/173,221, filed on Dec. 27, 1999.

(51) Int. Cl.[7] .............................. H02K 5/00; H02K 5/16; F16M 1/00
(52) U.S. Cl. .............................. 310/91; 310/90; 248/638
(58) Field of Search .............................. 310/89, 90, 91; 248/562, 638

(56) References Cited

U.S. PATENT DOCUMENTS

| | | | |
|---|---|---|---|
| 4,600,176 A | 7/1986 | Baker | |
| 5,044,598 A | 9/1991 | Mann et al. | |
| 5,533,704 A | 7/1996 | Fischinger et al. | |
| 5,710,468 A | 1/1998 | Church et al. | |
| 6,252,321 B1 | 6/2001 | Fisher et al. | |

*Primary Examiner*—Nestor Ramirez
*Assistant Examiner*—Hanh Nguyen
(74) *Attorney, Agent, or Firm*—Karl Vick, Esq.; Armstrong Teasdale LLP

(57) ABSTRACT

A mounting assembly for an electric motor with deep drawn endshields includes a resilient outer ring and a split inner ring for gripping engagement with an outer surface of a bearing endshield. The gripping engagement is sufficient to hold the mounting assembly to the motor but insufficient to deform the endshields. The inner ring is distanced slightly from first and second ends of the mounting assembly to isolate and damp motor vibration and prevent vibration transmission to a mounting base.

15 Claims, 3 Drawing Sheets

RESILIENT RING MOTOR MOUNTING ASSEMBLY

CROSS REFERENCE TO RELATED APPLICATIONS

This application claims the benefit of U.S. Provisional Application No. 60/173,221, filed Dec. 27, 1999.

BACKGROUND OF THE INVENTION

This invention relates generally to motors, and more particularly, to mounting assemblies for electric motors with flat-faced ball bearing endshields.

Electric motors include ball bearings supporting a motor output shaft. These motors also typically include an endshield fabricated from die-cast aluminum and forming a bearing pocket to protect the bearings and to prevent contamination of bearing lubricants. Ring base mounts are sometimes used with motors to mount the motor to a base for a certain application.

Conventional ring base mounts incorporate a solid steel inner ring and/or a split steel or plastic outer ring, and are press fit onto an outer surface of a bearing housing over the endshield. However, some motors include deep drawn endshields to form the bearing pocket. The deep drawn endshields are susceptible to deformation when conventional press-fit resilient base mounts are used. In addition, known ring mounts are relatively rigid, which tends to transmit motor vibration to the base and generate undesirable noise during operation of the motor.

Accordingly, it would be desirable to provide a resilient ring base for use on motors with deep drawn endshields. Further, it would be desirable if the resilient ring base did not deform the bearing pockets and did not transmit motor vibration to the base.

BRIEF SUMMARY OF THE INVENTION

In an exemplary embodiment of the invention, a resilient ring mounting assembly for mounting a motor including a ball bearing endshield having an outer surface includes a resilient outer ring surrounding a split inner ring. The resilient outer ring includes a central opening slightly smaller than an outer diameter of the inner ring such that the inner ring is placed in compression. As the inner ring is inserted over the endshield outer surface, the inner ring flexes around the housing, and the resilient outer ring ensures that the inner ring grips the housing to securely engage the mounting assembly to the motor without deforming or damaging the bearing pocket. The resilient outer ring applies an inward radial force to the inner ring for engaging the endshield outer surface and holding the mounting assembly in place.

More specifically, the resilient outer ring comprises an adapter portion adapted for insertion into and engagement with a motor housing channel surrounding a motor bearing pocket adjacent the endshield. The resilient ring adapter portion engages the motor housing channel to facilitate isolation and damping of motor vibration. A cylindrical mounting portion extends from the adapter portion for mounting to a base according to known techniques. The relatively rigid split inner ring structurally supports the motor weight and components attached thereto, such as a fan blade or other driven component, and transfers structural loads from the motor housing through the resilient ring to a mounting base where the motor is installed.

DETAILED DESCRIPTION OF THE INVENTION

Figure 1:
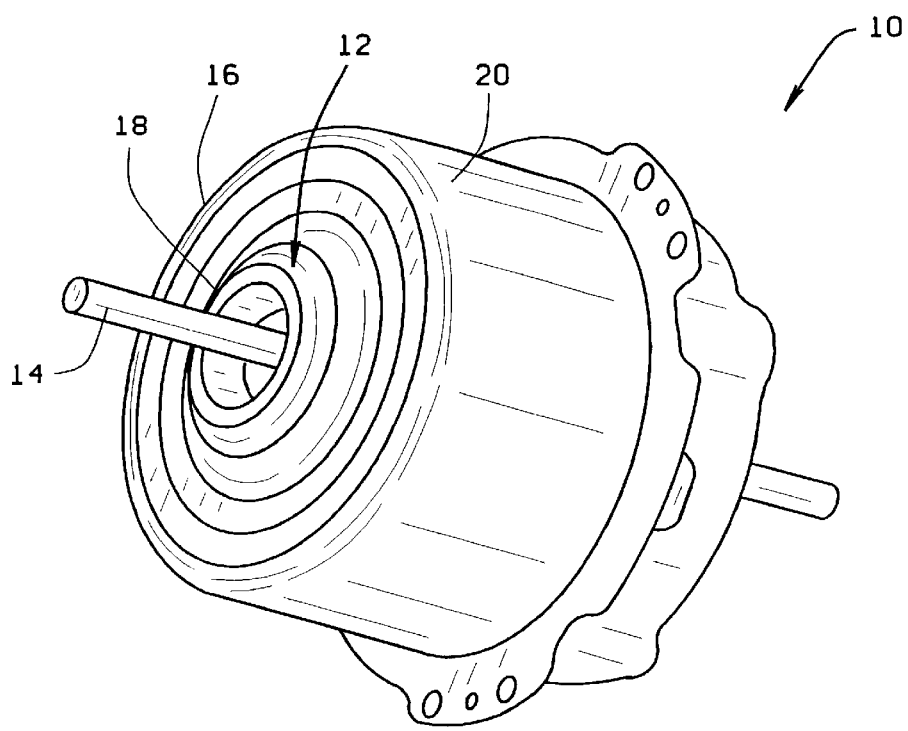
FIG. 1 is a perspective view of a motor with an installed resilient ring mounting assembly.

FIG. 1 is a perspective view of an electric motor 10 with a resilient ring mounting assembly 12 attached thereto. Motor 10 is a conventional electric motor including ball bearings (not shown) supporting a motor shaft 14 and a deep drawn endshield 16 upon which mounting assembly 12 is engaged without deforming or damaging the endshield as further described below. The construction and operation of motor 10 is well known in the art. It is contemplated that the benefits of the invention accrue to various types of motors, including motors with other types of bearings besides ball bearings, without departing from the scope of the invention. Therefore, the invention is not restricted to a particular motor type, such, as for example, motor 10.

Resilient ring mounting assembly 12 is inserted over endshield 16 of motor 10 and motor shaft 14 extends therethrough. An outer end 18 of resilient ring mounting assembly 12 extends from a motor housing 20 for engagement with an appropriate mounting base (not shown) for a selected application of motor 10.

Figure 2:
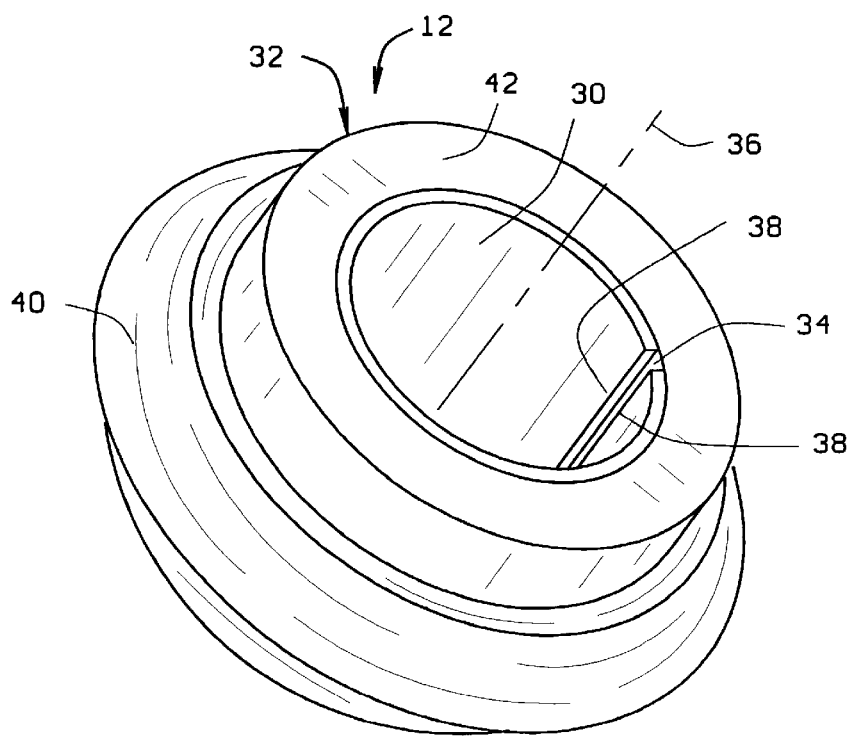
FIG. 2 is a bottom perspective view of the resilient ring mounting assembly shown in FIG. 1.

FIG. 2 is a bottom perspective view of resilient ring mounting assembly 12 including an inner ring 30 fabricated from a relatively rigid material, such as, for example, low carbon steel with G40 zinc coating, and a resilient outer ring 32 fabricated from a resilient, high energy absorbing "rubber" material, such as, for example, EPDM (Ethylene–Propylene). Inner ring 30 includes a split 34 extending parallel to a longitudinal axis 36 extending through resilient ring mounting assembly 12 to allow inner ring 30 to flex outwardly around a bearing pocket housing or endshield (not shown in FIG. 1) while remaining longitudinally rigid for structural support. Resilient outer ring 32 surrounds inner ring 30 and is coupled thereto with an interference fit, i.e., an inner diameter of resilient outer ring 32 is slightly smaller than an outer diameter of inner ring 30. Therefore, resilient outer ring 32 applies an inwardly directed radial force on inner ring 30, bringing side edges 38 of inner ring split 34 closer together than they would otherwise be in a relaxed state. Resilient outer ring 32 includes a cone shaped adapter portion 40 and a cylindrical mounting portion 42 extending therefrom, as further explained below.

Figure 3:
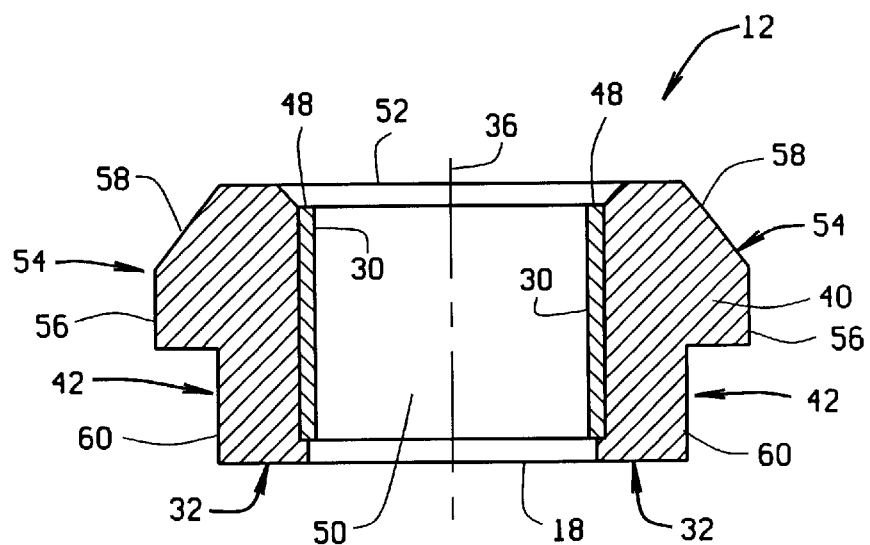
FIG. 3 is a cross sectional view of the resilient ring mounting assembly shown in FIG. 2.

FIG. 3 is a cross sectional view of resilient ring mounting assembly 12 including substantially symmetrical inner ring 30 and resilient outer ring 32 about longitudinal axis 36. Inner ring 30 extends substantially through a cylindrical passage 48 in resilient outer ring 32. Passage 48 increases in radius above a top edge 50 of inner ring 30 to form a conical shaped opening that facilitates insertion of mounting assembly 12 over the motor endshields (not shown). Inner ring 30 is distanced slightly from resilient ring mounting assembly outer end 18 where mounting assembly is attached to a base (not shown) and also distanced slightly from an inner end 52 for engagement with motor housing 20. The distance, or separation from inner and outer ends 18, 52, (shown in FIG. 1) respectively, facilitate isolation and damping of motor vibration during operation of motor 10 (shown in FIG. 1). In an exemplary embodiment, resilient outer ring 32 is chemically bonded to inner ring 30 using known chemical attachment methods to prevent relative movement of inner ring 30 with respect to resilient outer ring 32. In alternative embodiments, inner ring 30 is mechanically bonded, or otherwise coupled to, resilient outer ring 32 with adhesives or engaging surface projections (not shown), including but not limited to retaining lips and ledges on one or both of inner and outer rings 30, 32.

Resilient outer ring adapter portion 40 includes an outer surface 54 including a portion 56 extending substantially parallel to longitudinal axis 36, and a portion 58 extending obliquely toward longitudinal axis 36 from parallel portion 56. Thus, adapter portion 40 is substantially conical in shape, and in an exemplary embodiment, adapter parallel portion 56 is cylindrical. Parallel portion 56 extends a further distance from longitudinal axis 36 than an exterior surface 60 of mounting portion 42, and outer end 18 and inner end 52 of mounting assembly 12 are substantially flat. In an exemplary embodiment, mounting portion exterior surface 60 is cylindrical.

Figure 4:
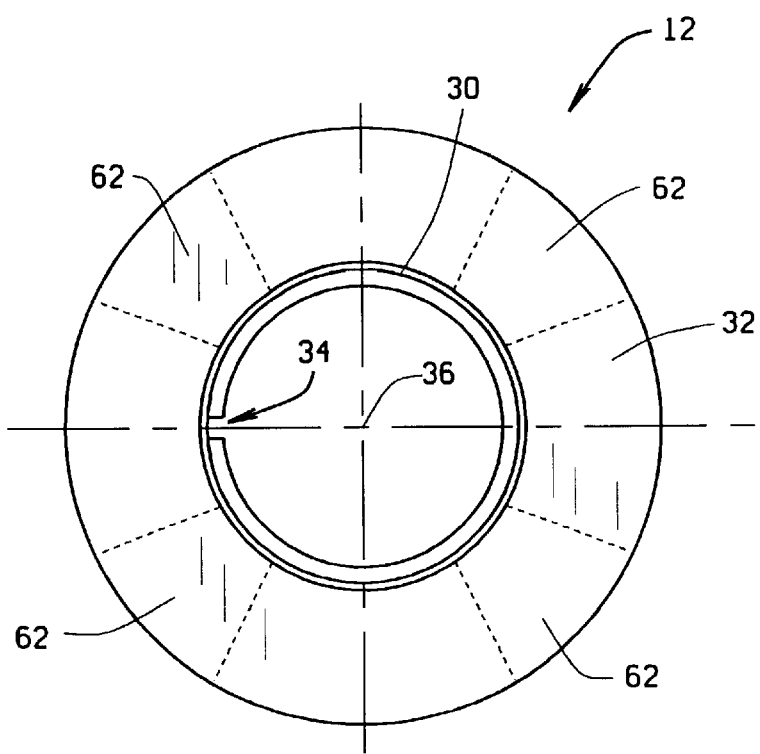
FIG. 4 is a top plan view of the resilient ring mounting assembly shown in FIG. 2.

FIG. 4 is a top plan view of mounting assembly 12 illustrating inner ring split 34 extending parallel to longitudinal axis 36. Split 34 allows flexibility, or adjustability, of an inner diameter of inner ring 30 as mounting assembly 12 is positioned over a pocket bearing endshield (not shown). Thus, resilient outer ring 32 allows inner ring 30 to expand as inner ring 30 is installed on motor 10 (shown in FIG. 1) to prevent deformation of the bearing pocket, while still applying a radially directed gripping force to hold mounting assembly 12 to motor 10. In one embodiment, material costs of outer ring 32 are reduced by removing one or more segments, such as wedge shaped, or pie shaped, segments 62 (shown in phantom in FIG. 4), of resilient material from outer ring adapter portion 54. By removing segments 62 of adapter portion 40 from adapter portion inner end 52, resilient material costs may be reduced and yet an adequate gripping force on inner ring 30 may be produced.

Figure 5:
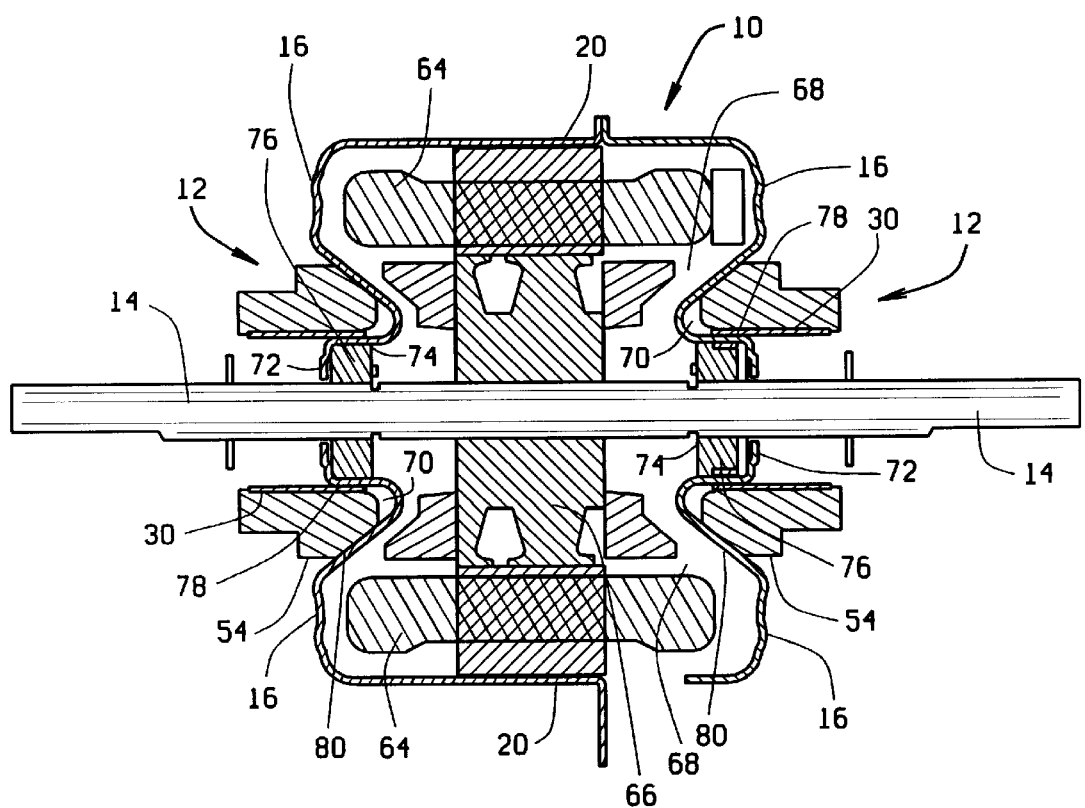
FIG. 5 is a cross sectional view of the motor and resilient ring mounting assembly shown in FIG. 1.

FIG. 5 is a cross sectional view of motor 10 with resilient ring mounting assembly 12 installed. Motor 10 includes housing 20 and a stator assembly 64 having one or more windings (not shown) positioned therein. A rotor assembly 66 is rotatably mounted and extends through a bore 68 in stator assembly 64. Motor shaft 14 is coupled to rotor assembly 66 for rotary movement when the stator windings are energized. Bearings 76, such as for example, ball bearings are located within bearing pocket 74 to support motor shaft 14 and facilitate rotary motion of shaft 14. Motor housing 20 includes a channel 70 partially formed by deep drawn endshields 16 including flat faces 72 adjacent a bearing pocket 74.

Resilient ring mounting assembly 12 is inserted over shaft 14 and endshield 16 of motor 10 until inner ring 30 engages an outer surface 78 of endshield 16. Edges 38 (shown in FIG. 2) of inner ring split 34 (shown in FIG. 2) separate as necessary to accommodate or conform to endshield outer surface 78 as resilient ring mounting assembly 12 is installed. Mounting assembly 12 is inserted over endshield 16 until endshield adapter portion outer surface 54 engages an inner surface 80 of channel 70, thereby compressing resilient outer ring 32 and applying a gripping force on inner ring 30 sufficient to hold mounting assembly 12 to motor 10 but insufficient to deform endshield 16 around bearing pocket 74. Mounting assembly 12 is securely attached to a base (not shown) using, for example, clamps (not shown) or other known attachment methods to securely hold mounting portion 42 to the base and prevent mounting assembly 12 from rotating with motor shaft 14.

Resilient ring mounting assembly 12 structurally supports the weight of motor 10 and attached drive components, such as, for example, fan blades (not shown), with longitudinally rigid inner ring 30. Because inner ring 30 does not extend to inner end 52 (shown in FIG. 3) and outer end 18 (shown in FIG. 3) of mounting assembly 12, motor vibration is effectively isolated and absorbed, or damped, by resilient outer ring 34 to prevent undesirable noise and vibration when motor 10 is operated after being mounted to the base.

While the invention has been described in terms of various specific embodiments, those skilled in the art will recognize that the invention can be practiced with modification within the spirit and scope of the claims.

What is claimed is:

1. A resilient ring mounting assembly for a motor including an endshield having an outer surface, said mounting base assembly comprising:
   a split inner ring; and
   a resilient outer ring surrounding said split inner ring, thereby allowing said inner ring to grip the outer surface of the endshield when said inner ring is inserted over the endshield.

2. A resilient ring mounting assembly in accordance with claim 1 wherein said inner ring includes a longitudinal axis, said inner ring split along an axis parallel to said longitudinal axis.

3. A resilient ring mounting assembly in accordance with claim 1 wherein said inner ring comprises steel.

4. A resilient ring mounting assembly in accordance with claim 1 wherein said resilient ring comprises rubber.

5. A resilient ring mounting assembly in accordance with claim 1 wherein the endshield outer surface extends from a motor housing, said housing forming an outer channel adjacent the outer surface, said resilient ring comprising an adapter portion for insertion into said channel, said adapter portion engaging said outer channel and said inner ring engaging the outer surface of the endshield.

6. A resilient ring mounting assembly in accordance with claim 1 wherein said inner ring comprises a longitudinal axis, said adapter portion comprises an outer surface, a portion of said outer surface oblique to said longitudinal axis.

7. A resilient ring mounting assembly in accordance with claim 6, a portion of said outer surface of said adapter portion parallel to said longitudinal axis.

8. A resilient ring mounting assembly in accordance with claim 7 wherein said partially parallel outer surface is cylindrical.

9. A resilient ring mounting assembly in accordance with claim 7 wherein said resilient ring comprises a mounting portion extending from said adapter portion.

10. A resilient ring mounting assembly in accordance with claim 7 wherein said mounting portion comprises an outer surface, said partially parallel surface of said adapter portion extending a greater distance from said longitudinal axis than said outer surface of said mount portion.

11. A resilient ring mounting assembly in accordance with claim 1 wherein said inner ring is bonded to said resilient ring.

12. A motor mounting assembly comprising:
   a motor comprising a motor housing, a stator assembly within said housing, and a rotor assembly comprising a motor shaft rotatably mounted therein, said housing comprising a bearing pocket and an endshield surrounding said bearing pocket and forming a channel adjacent said pocket;

a resilient outer ring comprising an adapter portion configured to seat in said channel and a mounting portion extending from said adapter portion, said adapter portion and said mounting portion comprising an opening therethrough; and a split inner ring within said opening and attached thereto with an interference fit, thereby placing said inner ring in compression, said inner ring inserted over said bearing pocket and engaging said bearing pocket.

13. A motor mounting assembly in accordance with claim 12 further comprising a longitudinal axis extending through said opening, said inner ring split parallel to said longitudinal axis, said split extending through both said adapter portion and said mounting portion.

14. A motor mounting assembly in accordance with claim 13 wherein said inner ring is bonded to said outer ring.

15. A motor mounting assembly in accordance with claim 12 wherein said mounting portion is cylindrical and said adapter portion is conical.

* * * * *

UNITED STATES PATENT AND TRADEMARK OFFICE
CERTIFICATE OF CORRECTION

PATENT NO. : 6,462,446 B2
DATED : October 8, 2002
INVENTOR(S) : Cook et al.

It is certified that error appears in the above-identified patent and that said Letters Patent is hereby corrected as shown below:

<u>Column 4,</u>
Line 18, after "mounting" delete "base".
Line 42, delete "claim 1" and insert therefor -- claim 5 --.

Signed and Sealed this

Nineteenth Day of October, 2004

JON W. DUDAS
*Director of the United States Patent and Trademark Office*